United States Patent
Yang et al.

(10) Patent No.: US 11,835,819 B2
(45) Date of Patent: Dec. 5, 2023

(54) REFLECTIVE SHEET, BACKLIGHT MODULE, AND DISPLAY DEVICE

(71) Applicant: Radiant Opto-Electronics Corporation, Kaohsiung (TW)

(72) Inventors: Tzu-Ching Yang, Kaohsiung (TW); Ya-Yun Hsieh, Kaohsiung (TW); Pei-Ling Kao, Kaohsiung (TW); Pei-Fen Hou, Kaohsiung (TW)

(73) Assignee: Radiat Opto-Electronics Corporation, Kaohsiung (TW)

( * ) Notice: Subject to any disclaimer, the term of this patent is extended or adjusted under 35 U.S.C. 154(b) by 0 days.

(21) Appl. No.: 17/973,761

(22) Filed: Oct. 26, 2022

(65) Prior Publication Data
US 2023/0106059 A1 Apr. 6, 2023

Related U.S. Application Data

(63) Continuation of application No. PCT/CN2021/119156, filed on Sep. 17, 2021.

(51) Int. Cl.
*G02F 1/00* (2006.01)
*G02F 1/13357* (2006.01)

(52) U.S. Cl.
CPC .. *G02F 1/133605* (2013.01); *G02F 1/133603* (2013.01); *G02F 1/133608* (2013.01)

(58) Field of Classification Search
CPC ......... G02F 1/133603; G02F 1/133608; G02F 1/133605
See application file for complete search history.

(56) References Cited

U.S. PATENT DOCUMENTS

| 4,787,592 A | 11/1988 | Aoshika |
| 10,920,959 B2 | 2/2021 | Vasylyev |

(Continued)

FOREIGN PATENT DOCUMENTS

| CN | 201201721 Y | 3/2009 |
| CN | 201989701 U | 9/2011 |

(Continued)

*Primary Examiner* — Gerald J Sufleta, II

(57) ABSTRACT

A reflective sheet comprises a plurality of perforations for extending a plurality of light-emitting elements therein, the reflective sheet further comprises a central line passing through its center, at least one first dimming area, and at least one second dimming area, and the distance between the at least one first dimming area and the central line is smaller than the distance between the at least one second dimming area and the central line. The light-emitting elements are distributed in the at least one first dimming area and the at least one second dimming area, the at least one first dimming area has a first dimming means, the at least one second dimming area has a second dimming means, the dimension of the first dimming means is different from the dimension of the second dimming means. Through the structural design of the reflective sheet, the luminance difference between the first dimming area and the second dimming area can be reduced, and the uniformity of the brightness in the whole area (Area Scan) can be improved. This invention also provides a backlight module and a display device including the reflective sheet.

13 Claims, 4 Drawing Sheets

(56) References Cited

U.S. PATENT DOCUMENTS

| | | | | |
|---|---|---|---|---|
| 2010/0142188 A1* | 6/2010 | Ha | | G02B 5/045 |
| | | | | 362/97.1 |
| 2011/0044027 A1* | 2/2011 | Chen | | G02F 1/133605 |
| | | | | 257/E33.044 |
| 2017/0192302 A1 | 7/2017 | Kim et al. | | |
| 2019/0324323 A1 | 10/2019 | Oh et al. | | |
| 2021/0026202 A1* | 1/2021 | Nam | | G02F 1/133609 |
| 2021/0088852 A1* | 3/2021 | Kim | | G02F 1/133603 |
| 2021/0349352 A1* | 11/2021 | Ito | | G02F 1/133611 |
| 2022/0269131 A1* | 8/2022 | Xie | | G02F 1/133605 |

FOREIGN PATENT DOCUMENTS

| | | | | |
|---|---|---|---|---|
| CN | 102859264 A | 1/2013 | | |
| CN | 103185318 A | 7/2013 | | |
| CN | 203363994 U | 12/2013 | | |
| CN | 105371164 A | 3/2016 | | |
| CN | 107024798 A | 8/2017 | | |
| CN | 209070276 U | 7/2019 | | |
| CN | 209245872 U | 8/2019 | | |
| CN | 110701520 A | 1/2020 | | |
| CN | 210005832 U | 1/2020 | | |
| CN | 111668202 A | 9/2020 | | |
| CN | 112099265 A * | 12/2020 | ....... | G02F 1/133605 |
| CN | 112204304 A | 1/2021 | | |
| CN | 214041938 U | 8/2021 | | |
| CN | 216013890 U | 3/2022 | | |
| TW | 201239246 A1 | 10/2012 | | |
| TW | M580691 U | 7/2019 | | |
| TW | M613857 U | 7/2021 | | |
| WO | 2020101946 A1 | 5/2020 | | |

* cited by examiner

REFLECTIVE SHEET, BACKLIGHT MODULE, AND DISPLAY DEVICE

RELATED APPLICATIONS

This application is a continuation application of International Application No. PCT/CN2021/119156, filed on Sep. 17, 2021. The entire disclosures of all the above applications are hereby incorporated by reference.

FIELD OF THE INVENTION

The present invention relates to an optical element, particularly a reflective sheet, a backlight module, and a display device.

BACKGROUND OF THE INVENTION

Conventional backlight modules can be categorized into "side-lit type" and "direct-lit type". The direct-lit type backlight module usually uses multiple light emitting diodes as the light source, and a light spreading distance is reserved between the light emitting diodes and the diffuser or light guide plate. Then a liquid crystal panel is arranged on the diffuser or the light guide plate to provide a uniform surface light source.

However, the light intensity generated from the light-emitting diodes will be the strongest in the direction of the front viewing angle (that is, the normal direction of the light-emitting surface of the light-emitting diode). Therefore, a bright spot will still be occurred in the orthographic projection area of the light-emitting diode corresponding to the light guide plate, resulting in uneven brightness of the surface light source. In addition, the brightness of the middle area of the backlight module will be contributed by more light-emitting diodes, and the brightness of the surrounding area of the backlight module can only be contributed by fewer light-emitting diodes because it is close to the side wall. Therefore, the brightness of the middle area of the backlight module is higher than the brightness of the surrounding areas of the backlight module, which also causes uneven brightness of the surface light source, and the uniformity of the brightness in the whole area (Area Scan) is poor.

SUMMARY OF THE INVENTION

One object of the present invention is to provide a reflective sheet that can improve the uniformity of the brightness of the whole area (Area Scan).

The reflective sheet comprises a plurality of perforations for disposing a plurality of light-emitting elements therein, the reflective sheet further comprises a central line passing through its center, at least one first dimming area, and at least one second dimming area, and the distance between the at least one first dimming area and the central line is smaller than the distance between the at least one second dimming area and the central line. The light-emitting elements are distributed in the at least one first dimming area and the at least one second dimming area, the at least one first dimming area has a first dimming means, the at least one second dimming area has a second dimming means, and the dimension of the first dimming means is different from the dimension of the second dimming means.

In a preferable embodiment, each of the at least one first dimming area and the at least one second dimming area has a bottom wall and a surrounding wall connected to the bottom wall, the end of the surrounding wall surrounds an opening, the perforations are respectively formed on the bottom wall of the at least one first dimming area and the at least one second dimming area, the openings of the at least one first dimming area and the at least one second dimming area are located on the same plane, a vertical distance is formed between the bottom wall and the opening, the dimension of the first dimming means is the vertical distance of the at least one first dimming area, the dimension of the second dimming means is the vertical distance of the at least one second dimming area, and the dimension of the first dimming means is smaller than the dimension of the second dimming means.

In a preferable embodiment, each of the at least one first dimming area and the at least one second dimming area has a bottom wall and a surrounding wall connected to the bottom wall, the perforations are respectively formed on the bottom wall of the at least one first dimming area and the at least one second dimming area, the dimension of the first dimming means is the aperture of the perforation of the at least one first dimming area, the dimension of the second dimming means is the aperture of the perforation of the at least one second dimming area, and the dimension of the first dimming means is larger than the dimension of the second dimming means.

In a preferable embodiment, the perforations are respectively formed in the at least one first dimming area and the at least one second dimming area, the dimension of the first dimming means is the aperture of the perforation of the at least one first dimming area, the dimension of the second dimming means is the aperture of the perforation of the at least one second dimming area, and the dimension of the first dimming means is larger than the dimension of the second dimming means.

Another object of the present invention is to provide a backlight module which comprises a light-emitting unit, a fixing element, and the reflective sheet as described above disposed on the fixing element. The light-emitting unit comprises a circuit board and a plurality of light-emitting elements arranged on the circuit board at intervals. The fixing element is arranged on the circuit board and comprising a plurality of holes for the light-emitting elements to pass through respectively.

Another object of the present invention is to provide a backlight module which comprises a light-emitting unit, a fixing element, and the reflective sheet as described above disposed on the fixing element. The light-emitting unit comprises a circuit board and a plurality of light-emitting elements arranged on the circuit board at intervals. The fixing element is arranged on the circuit board and comprising a plurality of holes for the light-emitting elements to pass through respectively. The fixing element has at least one first supporting portion corresponding to the at least one first dimming area, and at least one second supporting portion corresponding to the at least one second dimming area, the thickness of the first supporting portion is greater than the thickness of the second supporting portion, and the sum of the vertical distance of the at least one first dimming area and the thickness of the first supporting portion is equal to the sum of the vertical distance of the at least one second dimming area and the thickness of the second supporting portion.

In a preferable embodiment, the reflectivity of the fixing element is lower than the reflectivity of the reflective sheet.

In a preferable embodiment, the aperture of each of the perforations of the reflective sheet is larger than the aperture of each of the holes of the fixing element.

Another object of the present invention is to provide a display device which comprises the backlight module as described above, and a display panel arranged on the backlight module.

The characteristic of the present invention is that through the structural design of the reflective sheet, the luminance difference between the first dimming area and the second dimming area can be reduced, and the uniformity of the brightness (Area Scan) of the whole area can be improved.

DETAILED DESCRIPTION OF THE INVENTION

The detailed description and preferred embodiments of the invention will be set forth in the following content and provided for people skilled in the art to understand the characteristics of the invention.

Figure 1:
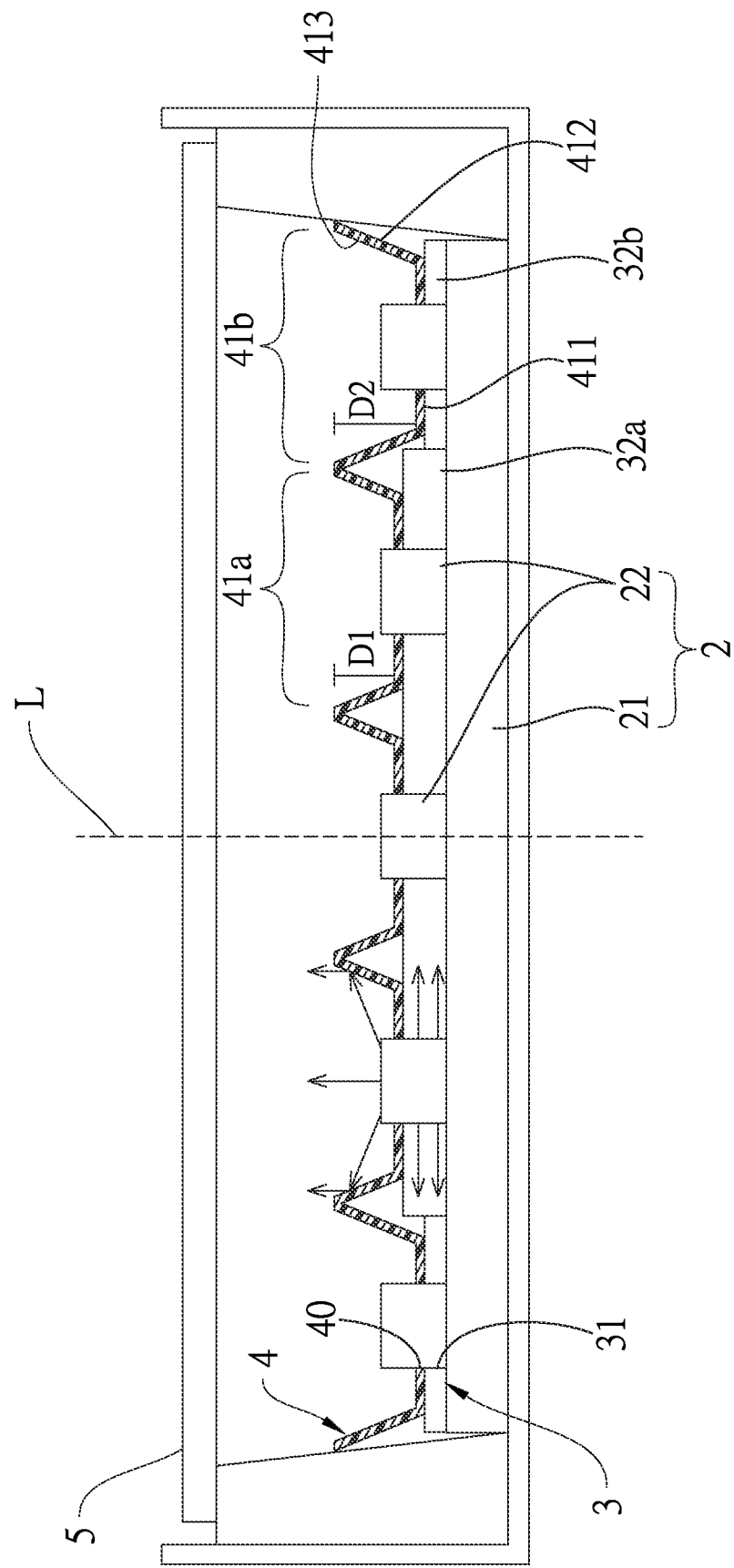
FIG. 1 is a cross-sectional diagram of a display device according to a preferred embodiment of this invention, wherein a reflective sheet has dimming areas with different depth.

Referring to FIG. 1, it is a preferred embodiment of the display device of the present invention. The display device comprises a light-emitting unit 2, a fixing element 3 disposed on the light-emitting unit 2, a reflective sheet 4 disposed on the fixing element 3, and a display panel 5 disposed on the light-emitting side of the reflective sheet 4. The light-emitting unit 2 includes a circuit board 21 and a plurality of light-emitting elements 22 disposed on the circuit board 21 at intervals. The fixing element 3 is disposed on the circuit board 21 and has a plurality of holes 31 for the light-emitting elements 22 to pass through respectively. In this embodiment, the fixing element 3 is an adhesive tape for fixing the reflective sheet 4 on the circuit board 21. In this way, the reflective sheet 4 can be prevented from shifting or deforming when the display device is impacted or performing a reliability test (RA test), thereby causing variation in the optical appearance. However, the fixing element 3 is not limited to the adhesive tape, and the fixing effect can also be achieved by means of optical glue or the like.

The reflective sheet 4 comprises a plurality of perforations 40 for the light-emitting elements 22 to be placed therein respectively. The reflective sheet 4 further comprises a center line L passing through its center point, a plurality of first dimming areas 41a, and a plurality of second dimming areas 41b. It should be noted that the distance between each of the first dimming area 41a and the center line L is smaller than the distance between each of the second dimming area 41b and the center line L. That is to say, the first dimming areas 41a are located at a relatively central position of the reflective sheet 4, and the second dimming areas 41b are located at a relatively outer side of the first dimming areas 41a. Each of the first dimming areas 41a and each of the second dimming areas 41b has a bottom wall 411 and a surrounding wall 412 connected to the bottom wall 411 to form a concave cup-shaped structure. The design of the reflective sheet 4 is such that the light emitted upward from the light-emitting elements 22 can be reflected by the surrounding wall 412 of the reflective sheet 4, thereby improving the contrast of the image. The end of each of the surrounding wall 412 surrounds an opening 413. The perforations 40 are respectively formed on the bottom walls 411 of each of the first dimming areas 41a and each of the second dimming areas 41b. The openings 413 of each of the first dimming areas 41a and of each of the second dimming areas 41b are located on the same plane. A vertical distance is formed between each of the bottom wall 411 and the corresponding opening 413.

The light-emitting elements 22 are respectively distributed in the first dimming areas 41a and the second dimming areas 41b. Each of the first dimming areas 41a has a first dimming means. Each of the second dimming areas 41b has a second dimming means. The dimension of the first dimming means is different from the dimension of the second dimming means. In this embodiment, the dimension of the first dimming means is the vertical distance D1 of each of the first dimming area 41a. The dimension of the second dimming means is the vertical distance D2 of each of the second dimming area 41b. The dimension of the first dimming means is smaller than the dimension of the second dimming means.

The openings 413 of the first dimming area 41a and the second dimming area 41b are located on the same plane, and the vertical distance D1 of the first dimming area 41a is short, therefore, each of the first dimming area 41a is a shallow concave cup shape, and each of the second dimming area 41b is a deep concave cup shape. In addition, the fixing element 3 has a plurality of first supporting portions 32a corresponding to the first dimming areas 41a and a plurality of second supporting portions 32b corresponding to the second dimming areas 41b respectively. The thickness of the first supporting portion 32a is greater than the thickness of the second supporting portion 32b, so that the sum of the vertical distance D1 of the first dimming area 41a and the thickness of the first supporting portion 32a is equal to the sum of the vertical distance D2 of the second dimming area 41b and the thickness of the second supporting portion 32b. Through the cooperation between the reflective sheet 4 and the fixing element 3, the fixing element 3 can provide a complete support for the reflective sheet 4, and the reflective sheet 4 is not slanted relative to the display panel 5.

Furthermore, whether the light-emitting element 22 is located in the first dimming area 41a or the second dimming area 41b, the lower half of the light-emitting element 22 is located out of the reflective sheet 4. Therefore, partial light is emitted between the reflective sheet 4 and the circuit board 21, and absorbed by the fixing element 3 (for example, the fixing element 3 made of the tape material is easier to absorb light), the light reflected by the reflective sheet 4 is reduced, thereby reducing the reflective effect.

This embodiment is mainly based on the above-mentioned principle, and at the same time with the technical feature that the vertical distance D1 of the first dimming area 41a is shorter. Therefore, a relatively high proportion of the lower half of the light-emitting element 22 located in the first dimming area 41a is located out of the reflective sheet 4. As for the light-emitting element 22 located in the second dimming area 41b, a lower proportion of the lower half of the light-emitting element 22 is located out of the reflective sheet 4. Therefore, the first dimming area 41a has a better reflection reduction effect than the second dimming area 41b. Taking the conventional direct-lit light source as an example, the central area is easy to produce a bright area due to the direct viewing angle position of each light source and the intersection of the light. The peripheral area is easy to produce a dark area due to insufficient brightness and resulting in uneven overall brightness. Through the above design, the present invention can reduce the brightness of the first dimming areas 41a, thereby reducing the brightness difference between the first dimming areas 41a and the second dimming areas 41b and improving the uniformity of the brightness in the whole area (Area Scan).

In addition, the present invention also provides other means to make the dimension of the first dimming means different from the dimension of the second dimming means.

Figure 2:
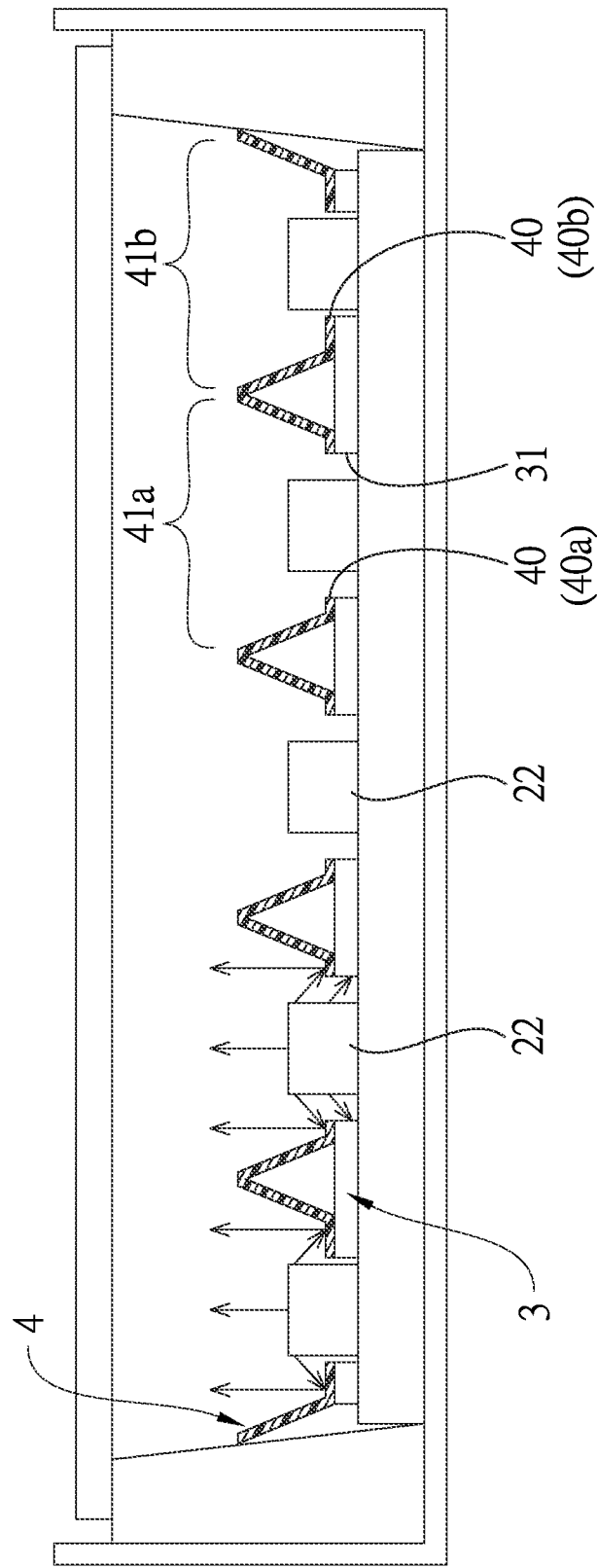
FIG. 2 is a cross-sectional diagram illustrating another form of the preferred embodiment, wherein the reflective sheet has dimming areas with different perforation dimensions.

Referring to FIG. 2, in some embodiments, the dimension of the first dimming means is the aperture of the perforation 40a of each of the first dimming area 41a, the dimension of the second dimming means is the aperture of the perforation 40b of each of the second dimming area 41b, and the dimension of the first dimming means is greater than the dimension of the second dimming means. Each of the first dimming areas 41a and each of the second dimming areas 41b is in the shape of a concave cup and having the same depth, the difference is that the dimension of the aperture of the perforation 40. After the light is emitted by the light-emitting element 22 located in each of the first dimming area 41a, a relatively high proportion of the light will be projected to the fixing element 3 and absorbed by the fixing element 3 because the apertures of the perforations 40a of the first dimming areas 41a are larger. Accordingly, the proportion of reflection by the reflective sheet 4 is reduced to improve the light absorption effect and reduce the reflection effect. The reduced amount of light reflected in the first dimming area 41a is more than the reduced amount of light reflected in the second dimming area 41b by using the method that the aperture of the perforation 40a of the first dimming area 41a is larger and the aperture of the perforation 40b of the second dimming area 41b is smaller. Therefore, the brightness of the first dimming area 41a is reduced, and the brightness difference between the first dimming area 41a and the second dimming area 41b is also reduced to improve the uniformity of the brightness of the whole area (Area Scan). Therefore, the present embodiment disclosed in FIG. 2 does not use the depth of the concave cup-shaped structure to adjust the reflective effect of the first dimming areas 41a and the second dimming areas 41b as shown in FIG. 1. Instead, the present embodiment uses the aperture dimension of the perforation to adjust the light absorption effect of the first dimming areas 41a and the second dimming areas 41b. If the aperture dimension of the perforation 40 has its design limit, the fixing element 3 with lower reflectivity can also be selected. Using the characteristic that the reflectivity of the fixing member 3 is smaller than that of the reflective sheet 4, the light absorption effect is further improved.

Figure 3:
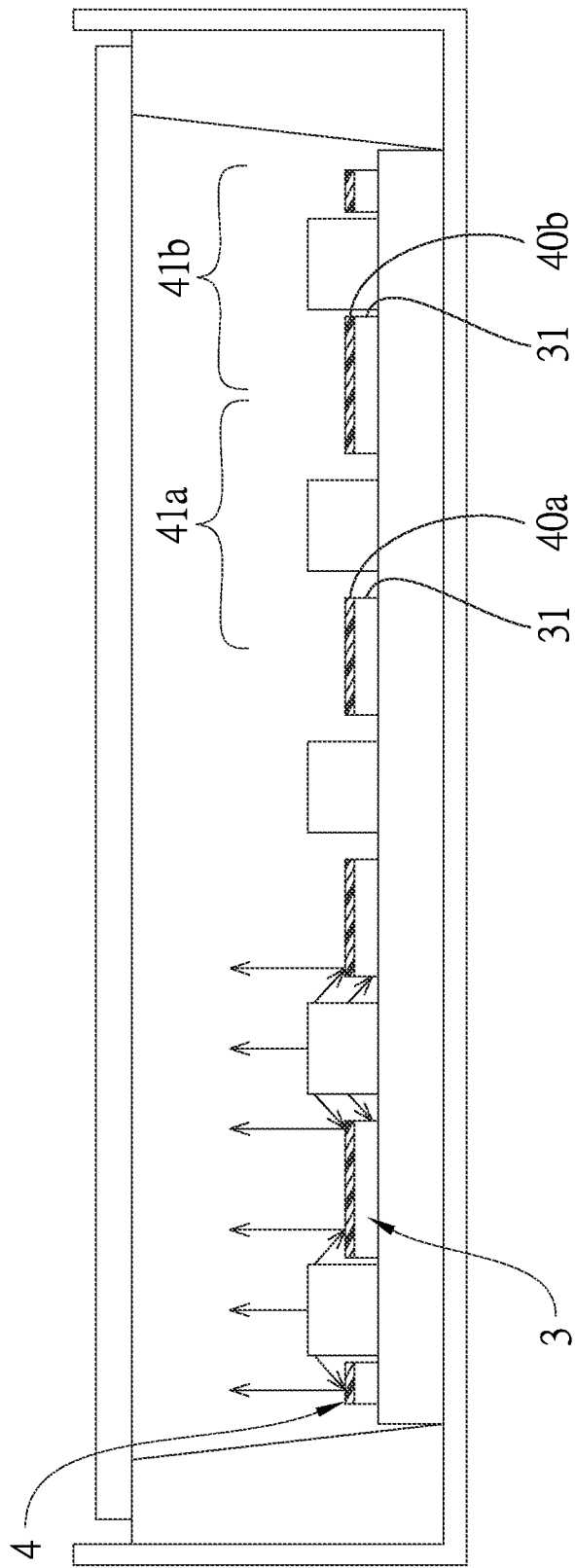
FIG. 3 is a cross-sectional diagram illustrating another form of the preferred embodiment, wherein the reflective sheet is planar and has dimming areas with different perforation dimensions.

It should be noted that, as shown in FIG. 3, the abovementioned designs with different dimensions of the perforations 40 can also be applied to a planar reflective sheet 4. The aperture of the perforation 40a of each of the first dimming area 41a is larger, and the aperture of the perforation 40b of each of the second dimming area 41b is smaller. The magnitude of the reduction in the amount of light reflected in each of the first dimming area 41a is greater than the magnitude of the reduction in the amount of light reflected in each of the second dimming area 41b. Therefore, the brightness of the first dimming area 41a is reduced, and the brightness difference between the first dimming area 41a and the second dimming area 41b is also reduced to improve the uniformity of the brightness of the whole area (Area Scan). In addition, the production of the planar reflective sheet 4 is simpler than that of the three-dimensional reflective sheet shown in FIG. 1 and FIG. 2, which further reduces the production cost.

Figure 4:
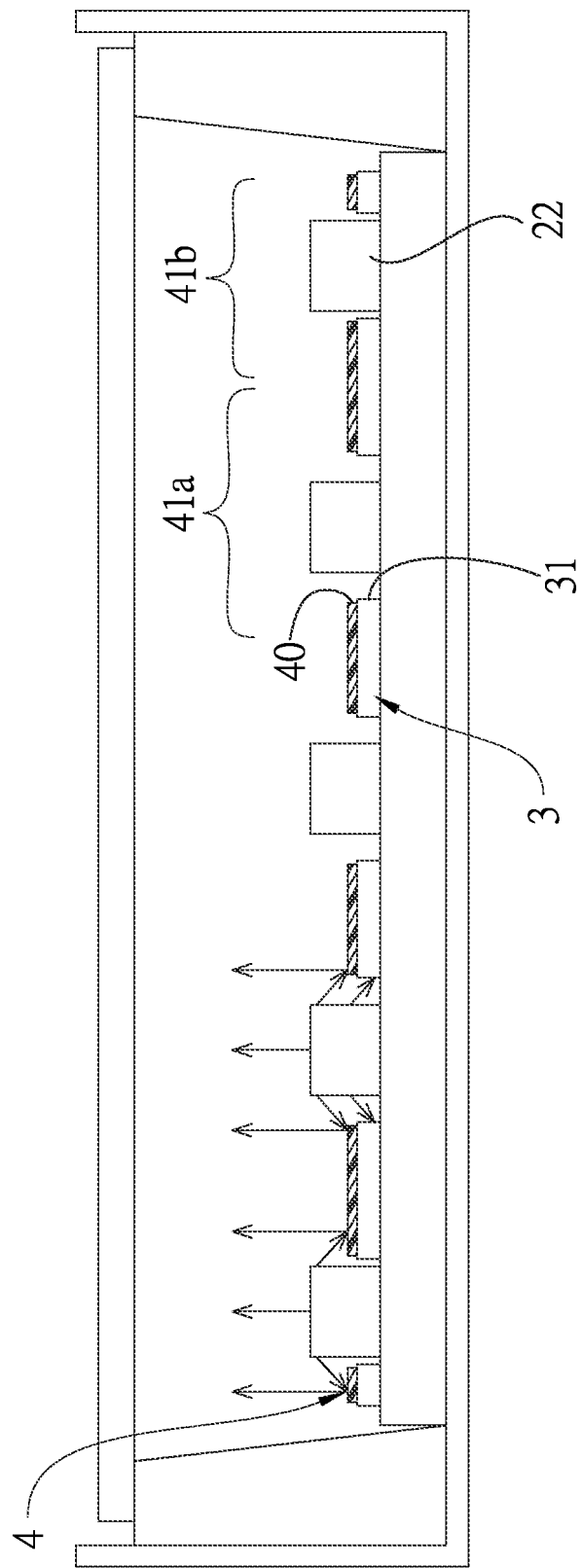
FIG. 4 is a cross-sectional diagram illustrating another form of the preferred embodiment, wherein the perforation of the reflective sheet is larger than the corresponding perforation on a fixing element.

It should be noted that, in FIG. 2, the aperture of the holes 31 of the fixing element 3 will be matched with the perforations 40a, 40b and have the same dimension. However, in some embodiments, as shown in FIG. 4, the aperture of the perforations 40 of the reflective sheet 4 is larger than the aperture of the hole 31 of the fixing element 3. That is to say, the above-mentioned design of the aperture dimension can make the reflective surface of the reflective sheet 4 become relatively small for the light emitted by the corresponding light-emitting element 22 in the first dimming area 41a, as well as the light-absorbing surface of the fixing element 3 become relatively large, thereby improves the light-absorbing effect. Therefore, in the embodiment shown in FIG. 4, the magnitude of the reduction in the amount of light reflected in the first dimming area 41a can be reduced more than that in the first dimming area 41a in the embodiment shown in FIG. 3, and the effect of reducing the brightness of the first dimming area 41a is more obvious.

The present invention discloses an embodiment of a display device. It is also possible to manufacture only the reflective sheet 4 or a backlight module assembled with the reflective sheet 4, the light-emitting unit 2 and the fixing element 3 according to customers requires or actual needs. The structures of the above-mentioned components can all refer to the embodiments disclosed in the FIG. 1 to FIG. 4, so they will not be repeated here.

To sum up, the present invention utilizes that the dimension of the first dimming means of the reflective sheet 4 is different from the dimension of the second dimming means, so as to reduce the brightness of the first dimming area 41a. Therefore, the luminance difference between the first dimming area 41a and the second dimming area 41b is reduced, and the uniformity of the brightness in the whole area (Area Scan) is improved.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A reflective sheet comprising: a plurality of perforations for disposing a plurality of light-emitting elements therein, the reflective sheet further comprising a central line passing through its center, at least one first dimming area, and at least one second dimming area, wherein the distance between the at least one first dimming area and the central line is smaller than the distance between the at least one second dimming area and the central line, the light-emitting elements are distributed in the at least one first dimming area and the at least one second dimming area, the at least one first dimming area has a first dimming means, the at least one second dimming area has a second dimming means, and a dimension of the first dimming means is different from a dimension of the second dimming means; and wherein each of the at least one first dimming area and the at least one second dimming area has a bottom wall and a surrounding wall connected to the bottom wall, the end of the surrounding wall surrounds an opening, the perforations are formed in each of the at least one first dimming area and the at least one second dimming area, the openings of the at least one first dimming area and the at least one second dimming area are located on a same plane, a vertical distance is formed between the bottom wall and the opening, the dimension of the first dimming means is the vertical distance of the at least one first dimming area, the dimension of the second dimming means is the vertical distance of the at least one second dimming area, and the dimension of the first dimming means is smaller than the dimension of the second dimming means.

2. A reflective sheet comprising: a plurality of perforations for disposing a plurality of light-emitting elements therein, the reflective sheet further comprising a central line passing through its center, at least one first dimming area, and at least one second dimming area, wherein the distance between the at least one first dimming area and the central line is smaller than the distance between the at least one second dimming area and the central line, the light-emitting elements are distributed in the at least one first dimming area and the at least one second dimming area, the at least one first dimming area has a first dimming means, the at least one second dimming area has a second dimming means, and a dimension of the first dimming means is different from a dimension of the second dimming means; and wherein each of the at least one first dimming area and the at least one second dimming area has a bottom wall and a surrounding wall connected to the bottom wall, the perforations are formed on each of the bottom wall of the at least one first dimming area and the at least one second dimming area, the dimension of the first dimming means is an aperture of the perforation of the at least one first dimming area, the dimension of the second dimming means is an aperture of the perforation of the at least one second dimming area, and the dimension of the first dimming means is larger than the dimension of the second dimming means.

3. A reflective sheet comprising: a plurality of perforations for disposing a plurality of light-emitting elements therein, the reflective sheet further comprising a central line passing through its center, at least one first dimming area, and at least one second dimming area, wherein the distance between the at least one first dimming area and the central line is smaller than the distance between the at least one second dimming area and the central line, the light-emitting elements are distributed in the at least one first dimming area and the at least one second dimming area, the at least one first dimming area has a first dimming means, the at least one second dimming area has a second dimming means, and a dimension of the first dimming means is different from a dimension of the second dimming means; and wherein the perforations are formed in each of the at least one first dimming area and the at least one second dimming area, the dimension of the first dimming means is an aperture of the perforation of the at least one first dimming area, the dimension of the second dimming means is an aperture of the perforation of the at least one second dimming area, and the dimension of the first dimming means is larger than the dimension of the second dimming means.

4. A backlight module comprising:
the reflective sheet as claimed in claim 1;
a light-emitting unit, comprising a circuit board and a wherein the plurality of light-emitting elements arranged on the circuit board at intervals;
a fixing element is arranged on the circuit board, the fixing element comprising a plurality of holes with each hole configured to accommodate a respective one of the light-emitting elements; and
wherein the reflective sheet as claimed in claim 1, is disposed on the fixing element.

5. A backlight module comprising:
the reflective sheet as claimed in claim 1;
a light-emitting unit, comprising a circuit board wherein the plurality of light-emitting elements arranged on the circuit board at intervals;
a fixing element is arranged on the circuit board the fixing element comprising a plurality of holes with each hole configured to accommodate a respective one of the light-emitting elements; and
wherein the reflective sheet as claimed in claim 1 is disposed on the fixing element;
wherein the fixing element has at least one first supporting portion corresponding to the at least one first dimming area, and at least one second supporting portion corresponding to the at least one second dimming area, the thickness of the first supporting portion is greater than the thickness of the second supporting portion, and the sum of the vertical distance of the at least one first dimming area and the thickness of the first supporting portion is equal to the sum of the vertical distance of the at least one second dimming area and the thickness of the second supporting portion.

6. The backlight module of claim 4, wherein the reflectivity of the fixing element is lower than the reflectivity of the reflective sheet.

7. The backlight module of claim 5, wherein the aperture of each of the perforations of the reflective sheet is larger than the aperture of each of the holes of the fixing element.

8. A display device comprising: the backlight module as claimed in claim 4, and a display panel arranged on the backlight module.

9. A display device comprising: the backlight module as claimed in claim 5, and a display panel arranged on the backlight module.

10. A backlight module comprising:
the reflective sheet as claimed in claim 2;
a light-emitting unit comprising a circuit board wherein the plurality of light-emitting elements arranged on the circuit board at intervals;
a fixing element is arranged on the circuit board, the fixing element comprising a plurality of holes with each hole configured to accommodate a respective one of the light-emitting elements; and
wherein the reflective sheet as claimed in claim 2 is disposed on the fixing element.

11. A backlight module comprising:
the reflective sheet as claimed in claim 3;
a light-emitting unit comprising a circuit board wherein the plurality of light-emitting elements arranged on the circuit board at intervals;
a fixing element is arranged on the circuit board, the fixing element comprising a plurality of holes with each hole configured to accommodate a respective one of the light- emitting elements; and
wherein the reflective sheet as claimed in claim 3 is disposed on the fixing element.

12. A display device comprising: the backlight module as claimed in claim 10, and a display panel arranged on the backlight module.

13. A display device comprising: the backlight module as claimed in claim 11, and a display panel arranged on the backlight module.

\* \* \* \* \*